(12) United States Patent
Vondracek

(10) Patent No.: US 7,889,982 B2
(45) Date of Patent: Feb. 15, 2011

(54) METHOD AND APPARATUS FOR A SUBMERSIBLE ELECTRONIC DEVICE

(76) Inventor: David J. Vondracek, 1515 Bonair St., Clearwater, FL (US) 33755

( * ) Notice: Subject to any disclaimer, the term of this patent is extended or adjusted under 35 U.S.C. 154(b) by 188 days.

(21) Appl. No.: 12/223,449

(22) PCT Filed: Feb. 28, 2007

(86) PCT No.: PCT/US2007/005007

§ 371 (c)(1),
(2), (4) Date: Jul. 31, 2008

(87) PCT Pub. No.: WO2007/100788

PCT Pub. Date: Sep. 7, 2007

(65) Prior Publication Data

US 2009/0010629 A1    Jan. 8, 2009

(51) Int. Cl.
*G03B 17/08* (2006.01)
(52) U.S. Cl. ............................ 396/25; 348/81
(58) Field of Classification Search ............ 396/25, 396/27, 543; 359/507; 348/81
See application file for complete search history.

(56) References Cited

U.S. PATENT DOCUMENTS

| 3,236,167 | A |   | 2/1966 | Lode |   |
|---|---|---|---|---|---|
| 4,281,343 | A | * | 7/1981 | Monteiro | 348/81 |
| 5,088,529 | A | * | 2/1992 | Jones et al. | 141/59 |
| 5,089,671 | A | * | 2/1992 | Ranetkins | 200/5 A |
| 5,645,382 | A | * | 7/1997 | Homanick et al. | 409/131 |
| 6,064,824 | A | * | 5/2000 | Rink | 396/25 |
| 6,404,560 | B1 |  | 6/2002 | Hori |   |
| 6,795,110 | B1 |   | 9/2004 | Kossin |   |
| 6,987,527 | B2 |   | 1/2006 | Kossin |   |
| 7,060,921 | B2 | * | 6/2006 | Kubo | 200/302.1 |
| 2001/0017772 | A1 |   | 8/2001 | Marshall |   |
| 2001/0053021 | A1 |   | 12/2001 | Delacoux |   |
| 2004/0134486 | A1 |   | 7/2004 | Robert et al. |   |
| 2005/0095159 | A1 | * | 5/2005 | Sumi et al. | 418/1 |
| 2006/0033678 | A1 |   | 2/2006 | Lubomirsky et al. |   |

FOREIGN PATENT DOCUMENTS

JP          07223589 A    *  8/1995

OTHER PUBLICATIONS

Kylstra ("The Feasibility of Liquid Breathing in Man", Feb. 28, 1977).*
3M Specialty Materials, Fluorinert™ Electronic Liquid FC-87 Product Information, (on-line), issued May 2000, pp. 1-4.

* cited by examiner

*Primary Examiner*—Clayton E LaBalle
*Assistant Examiner*—Leon W Rhodes
(74) *Attorney, Agent, or Firm*—Richard C. Litman

(57) ABSTRACT

The method and apparatus for a submersible electronic device provides an electronic device such as, for example, a digital camera (100), PDA, computer, or the like, which may comprise a user interface, a body (101), and an electronic assembly disposed within the body, the device being characterized in that the housing is completely filled with a perfluorocarbon (PFC) liquid, or a hydrofluoroether (HFE), or a perfluoropolyether (PFPE), or an aqueous coolant composition comprising a mixture of an alkylene glycol (such as propylene glycol), de-ionized water, and a corrosion inhibitor (such as benzotriazole). A method of introducing any of the aforementioned liquids into the device includes submersion into the liquid inside a vacuum chamber (150) so that air pockets are removed to provide total liquid dispersion into device cavities, and the like. The device is then sealed and removed from the chamber (150).

12 Claims, 5 Drawing Sheets

METHOD AND APPARATUS FOR A SUBMERSIBLE ELECTRONIC DEVICE

TECHNICAL FIELD

The present invention relates to electronic devices configured for use under extreme atmospheric pressure, such as, for example, an electronic device that is operational while being submerged under water, the device being filled with e.g., a perfluorocarbon (PFC) liquid to offset the extreme atmospheric pressure encountered by the device in the operational environment.

BACKGROUND ART

In the conventional use of an electronic device such as a camera, MP3 player, PDA, or the like, the device serves a particular purpose, such as the ability to take photographs, the ability to play a selection of audible programming material, and the ability to send, receive, enter, display, and/or store information from a keyboard or keypad equipped device. In most cases, it is important to have a user interface such as keyboard, keypad, pushbuttons, and/or display screen easily accessible for use by the user.

Unquestionably, the aforementioned devices have been engineered by taking into account the required human factors needed for ease of use by a user. Rather than reinvent the aforementioned devices with cumbersome interfaces to accommodate high pressure environments such as the underwater environment encountered by SCUBA divers, it would be desirable to improve or work with an existing device body and components to enable the device to function normally within high atmospheric diving environs.

Thus, a method and apparatus for a submersible electronic device solving the aforementioned problems is desired.

DISCLOSURE OF INVENTION

The disclosure is directed to a submersible electronic device. The device has a leakproof body with electronic components disposed within the device body. A user interface is disposed on the device body. The device body is completely filled with a liquid selected from the group consisting of a perfluorocarbon liquid, a hydrofluoroether liquid, a perfluoropolyether liquid, or a liquid comprising a mixture of alkylene glycol, de-ionized water, and a corrosion inhibitor, so that the liquid filled body and device are capable of withstanding extreme environmental pressures.

The disclosure is also directed to a camera. The camera includes a means for receiving light coming from outside the body of the camera. The camera body is completely filled with a liquid selected from the group consisting of a perfluorocarbon liquid, a hydrofluoroether liquid, a perfluoropolyether liquid, or a liquid comprising a mixture of alkylene glycol, de-ionized water, and a corrosion inhibitor, so that the liquid filled body and camera components are capable of withstanding extreme environmental pressures.

The disclosure is further directed to a method of making a submersible electronic device with a fluid access port disposed on the device body. The method includes placing the device inside a vacuum chamber work space and evacuating air from the vacuum chamber work space. Fluid is then injected into the vacuum chamber workspace so that the device is totally immersed in the fluid. The fluid is selected from a group consisting of a perfluorocarbon liquid, a hydrofluoroether liquid, a perfluoropolyether liquid, or a liquid comprising a mixture of alkylene glycol, de-ionized water, and a corrosion inhibitor. The fluid enters the device through the fluid access port disposed on the device body. The fluid is sealed inside the body of the device and the device is then removed from the vacuum chamber.

BRIEF DESCRIPTION OF THE DRAWINGS

Similar reference characters denote corresponding features consistently throughout the attached drawings.

BEST MODES FOR CARRYING OUT THE INVENTION

The present invention provides an electronic device such as, for example, a digital camera, PDA, computer, MP3 player, or the like, which may comprise a user interface disposed on the body of the device, and an electronic assembly disposed within the device body, the device being characterized in that the body is completely filled with a perfluorocarbon (PFC) liquid, or a hydrofluoroether (HFE), or a perfluoropolyether (PFPE), or an aqueous coolant composition comprising a mixture of an alkylene glycol (such as propylene glycol), de-ionized water, and a corrosion inhibitor (such as benzotriazole). The advantage of the aforementioned fluids is that they all possess an extremely high dielectric strength, are of extremely low conductivity, and are substantially inert and/or non-corrosive. A method of introducing any of the aforementioned liquids into the device includes submersion into the liquid inside a vacuum chamber so that air pockets are removed to provide total liquid dispersion into device cavities, and the like. The device is then sealed and removed from the chamber.

Figure 1:
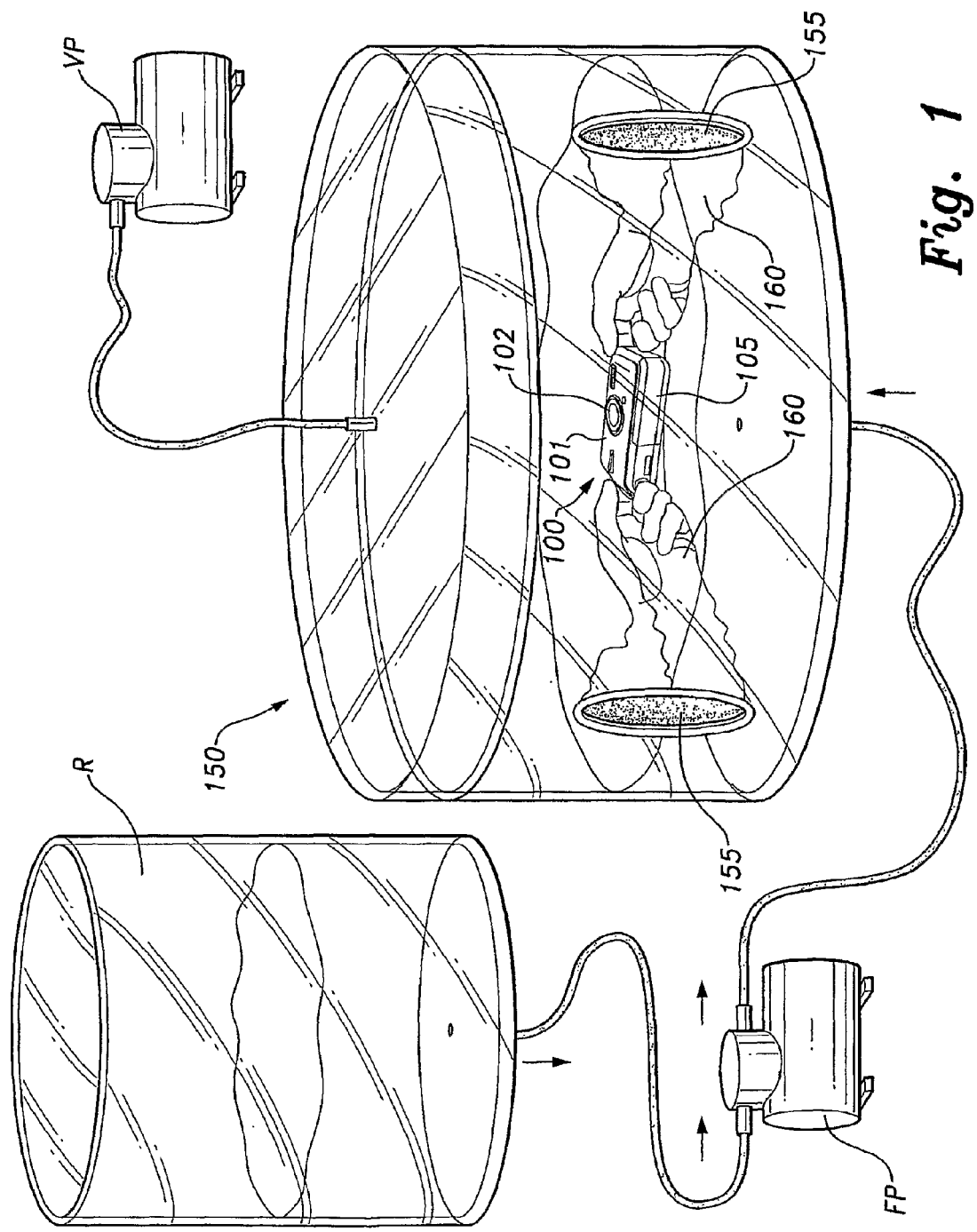
FIG. 1 is a perspective view of vacuum/fluid electronic device assembly 1st step, according to the present invention.

The inventive steps, according to the present invention are described with reference to FIGS. 1-4. Electronic device, such as digital camera 100, has the capability of forming a water-tight seal between the environment and the interior of the device, yet provides access to its interior so that a fluid can be introduced to the interior. The camera 100 has at least a camera body 101 and means, such as lens 102, for receiving light coming from outside the camera body 101. In the specific case of water-tight digital camera 100, access to the interior for liquid immersion may be provided through a battery compartment access door 105 disposed within the water-tight camera body 101. As shown in FIG. 1, a water-tight seal is formed via means of O ring seal 110 which is disposed around the lower perimeter of the battery compartment 107.

Fluid can be introduced into the camera body 101 of camera 100 when the access door 105 is opened and the battery pack BP is removed. The present invention contemplates preferably introducing the fluid to the camera 100 under vacuum conditions so that there are no interior air pockets to displace the fluid. Alternatively, the fluid may be introduced to the device 100 via immersion under standard atmospheric pressure, subsequently; the device 100 may be agitated to hopefully displace air pockets sufficiently for fluid dispersion into crevices, or the like.

Figure 2:
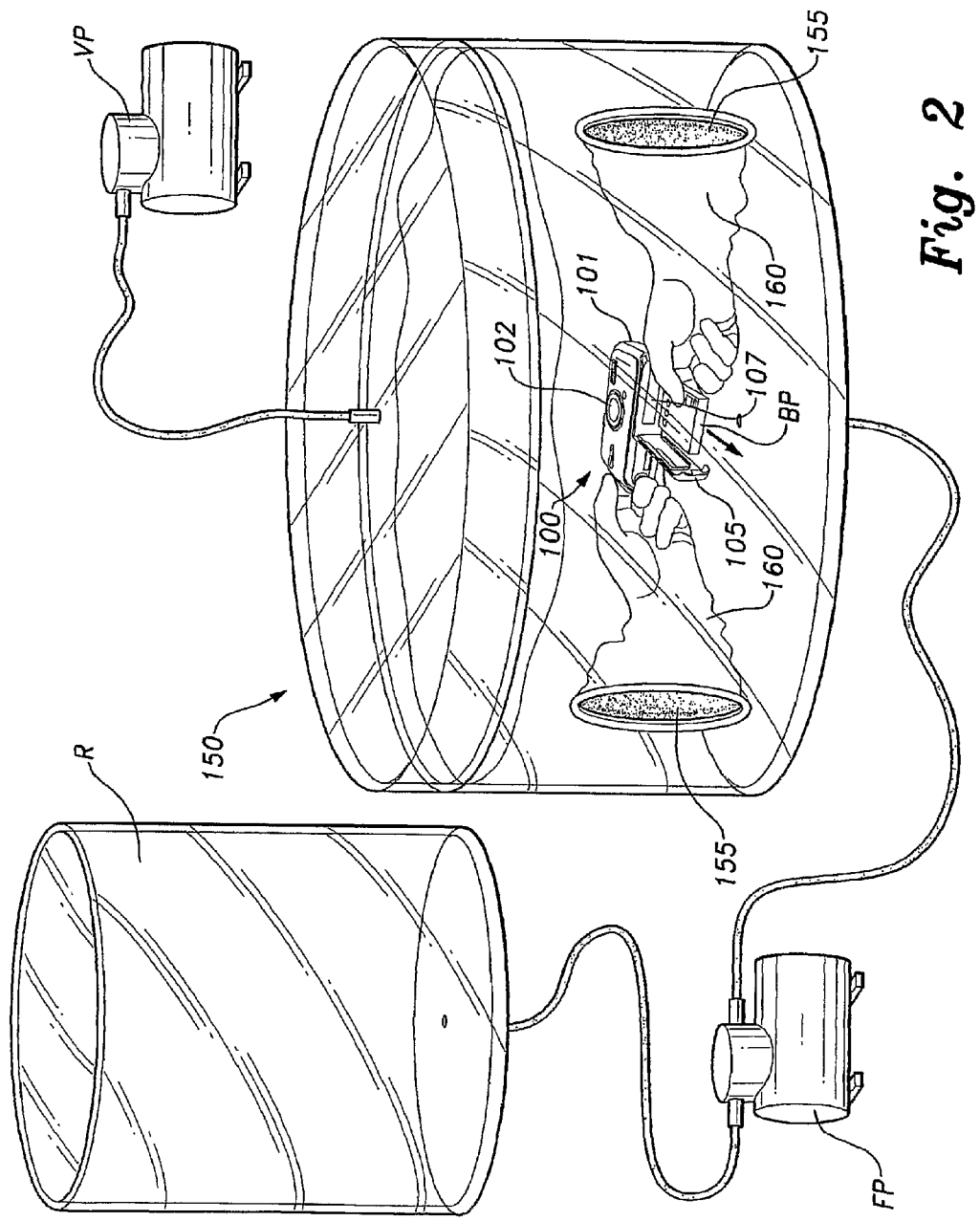
FIG. 2 is a perspective view of vacuum/fluid electronic device assembly 2nd step, according to the present invention.

As shown in FIGS. 1-4, a vacuum chamber 150 is used to ensure the absence of air pockets in the device 100 during fluid immersion. The vacuum chamber 150 has glove ports 155 to allow an assembler's hands to access gloves 160 inside the vacuum chamber 150. The device 100 is placed into the chamber 150. Then air is evacuated from the chamber using air pump VP. Next, the fluid in reservoir R is introduced into the chamber using fluid pump FP. The assembler can then grab the camera in preparation for fluid immersion of the interior of the camera 100. As shown in FIG. 2, the assembler opens access door 105 to the battery compartment 107 and removes the battery pack BP.

Figure 3:
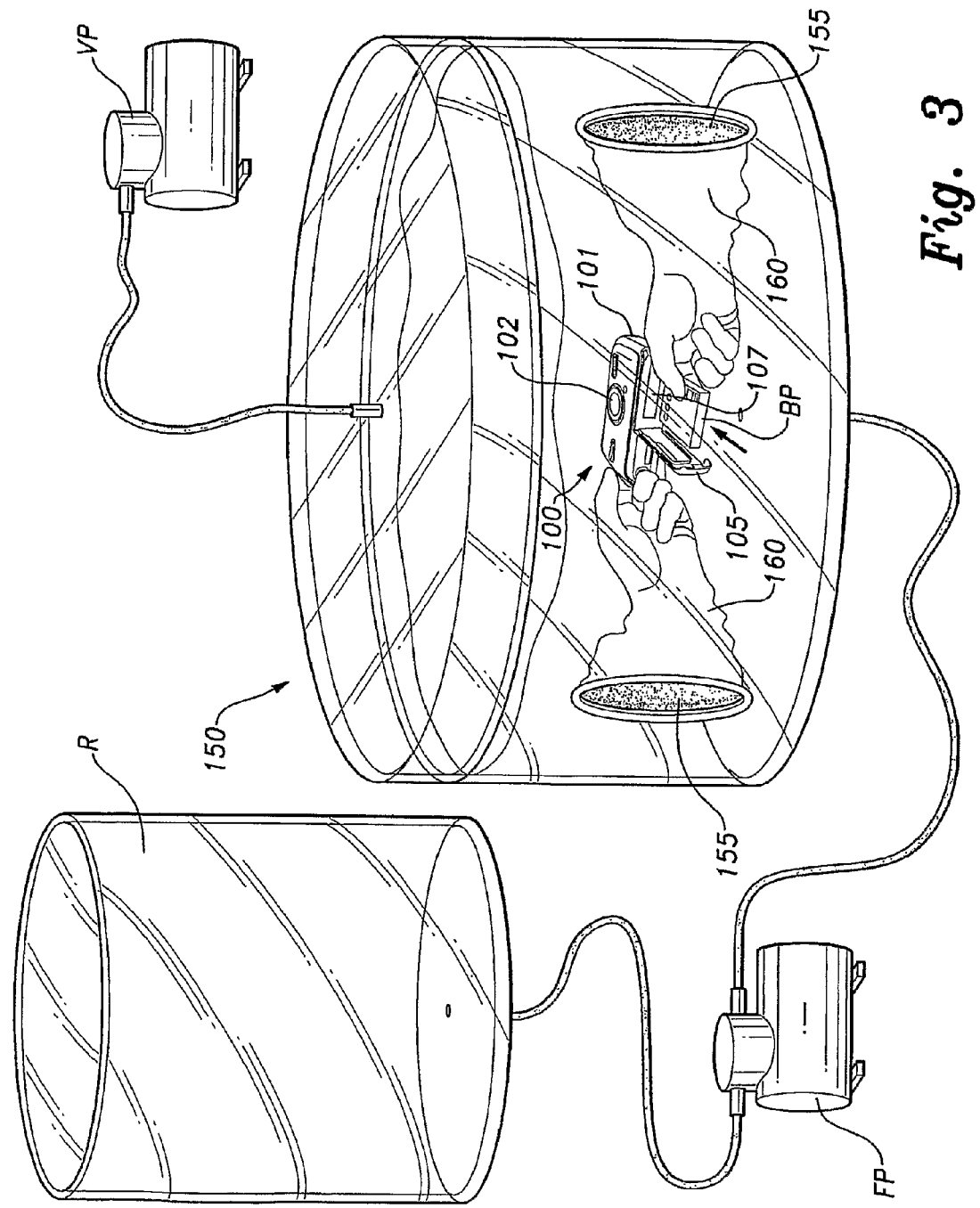
FIG. 3 is a perspective view of vacuum/fluid electronic device assembly 3rd step, according to the present invention.
Figure 4:
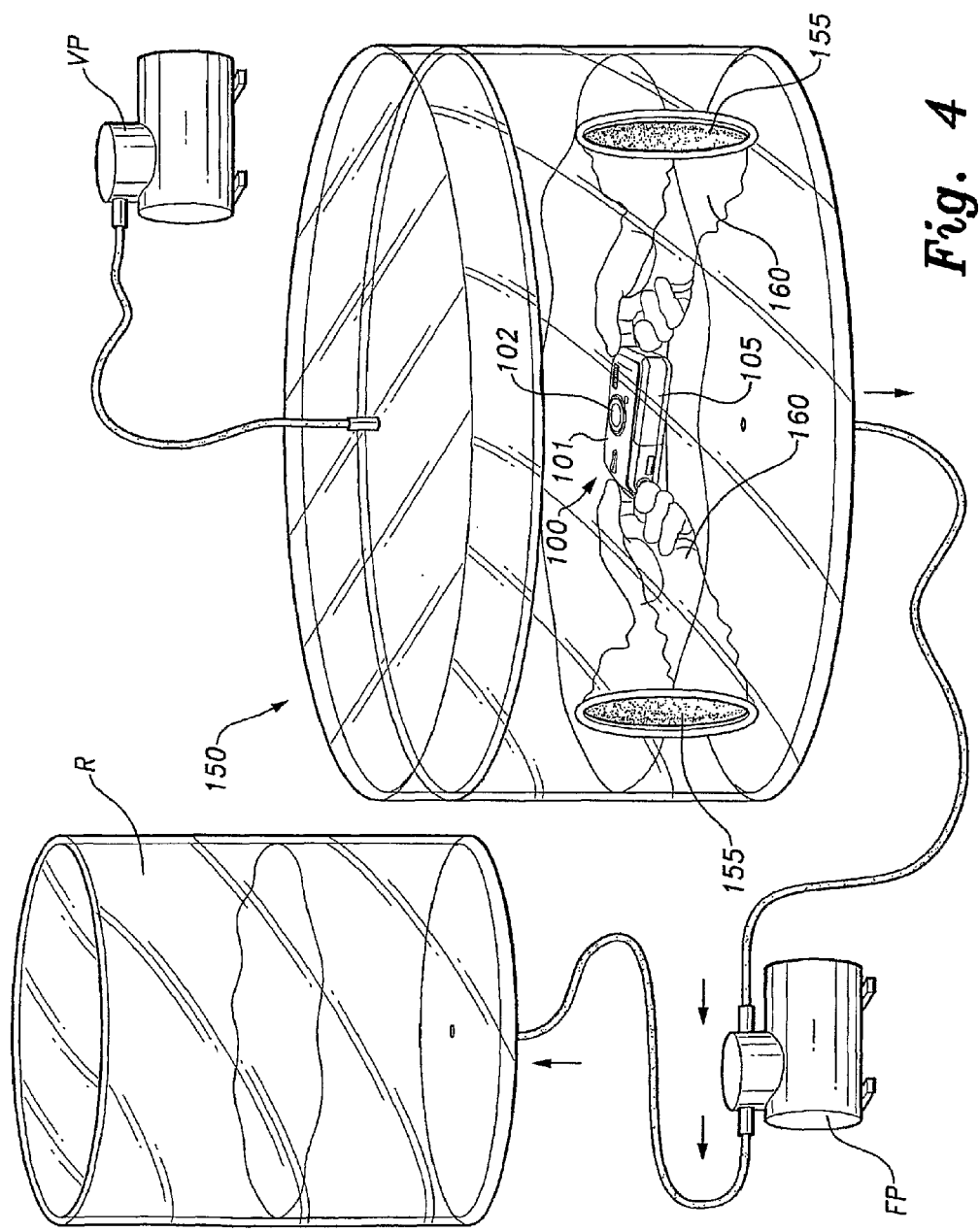
FIG. 4 is a perspective view of vacuum/fluid electronic device assembly 4th step, according to the present invention.

The fluid rushes into the device 100 surrounding all interior components and filling all interior voids. As shown in FIG. 3, the assembler replaces the battery pack BP into the battery compartment 107 of the camera 100. As shown in FIG. 4, the battery compartment access door 105 is closed and locked to seal the fluid inside the body 101 of camera 100. Fluid in the vacuum chamber 150 can then be pumped out via fluid pump FP, air can then be reintroduced into the chamber 150 and the camera 100 removed from the chamber 150. As contemplated by the present invention, the aforementioned fluid immersion process of camera 100 can be done using robotic assembly techniques in the vacuum chamber 150. The camera 100 or other electronic device being worked on can be delivered to the vacuum chamber 150 by automated means, such as e.g., a conveyer belt, and can exit the vacuum chamber 150 by similar automated means. Battery pack BP of the camera 100 or other electronic device preferably remains sealed in the device indefinitely so that the fluid immersion process does not have to be repeated. Various battery pack power retention methods which should be obvious to one having ordinary skill in the art may be employed in the device. These methods include, but are not limited to induction charging, charging through a re-sealable water tight charging port, providing a no-maintenance battery pack, or the like.

According to the present invention, fluids used may be one of or a combination of liquid perfluorocarbon (PFC), liquid hydrofluoroether (HFE), liquid perfluoropolyether (PFPE), or a mixture of an alkylene glycol (e.g., propylene glycol), de-ionized water, and a corrosion inhibitor, such as benzotriazole. Additionally, these liquids preferably have a viscosity similar to water, are non-flammable, are thermally and chemically stable, and compatible with sensitive materials found in electronic devices, such as, for example, metals, plastics, elastomers, and the like. The dielectric strength of the fluids used in the present invention should be approximately 35 KV or greater over a 0.10 inch electrode gap. The volume resistivity should be approximately $1 \times 10^8$ ohm-cm or greater. Fluid XP+™, 3M™ Fluorinert™ PFC fluids, Galden® PFPE fluids, and 3M™'s lower global warming potential class of HFE fluids are all commercially available products that can be used as the fluid medium according to the present invention. Moreover, the present invention contemplates the use of new chemical formulations for immersion into the body of the electronic device such as camera 100, yet having similar properties to the aforementioned fluids. In the event that the fluids used change refraction characteristics of a stock camera lens in camera 100, the lens 102 may be custom designed to compensate for the optical distortion introduced by the fluids.

Efficacy of the present invention has been demonstrated by fluid filling a Pentax® Optio-W10™ camera through its battery compartment with 3M™ Fluorinert™. The original W10™ camera is JIS Class 8 waterproof and Class 5 dustproof to allow underwater photography and video. However, the W10 specifications only allow for correct operation of the camera to a depth of 5 feet. Using the present invention of fluid filling the camera with 3M™ Fluorinert™, a dive was performed and the camera was successfully operated to a depth below sea of 130 feet. Subsequently as a control test, two of the same W10™ camera, without the modification of the present invention were taken on a dive and ceased to function at a depth of 20 feet below the surface. Flooding of the unmodified camera interior was observed at 45 feet below the surface.

Figure 5:
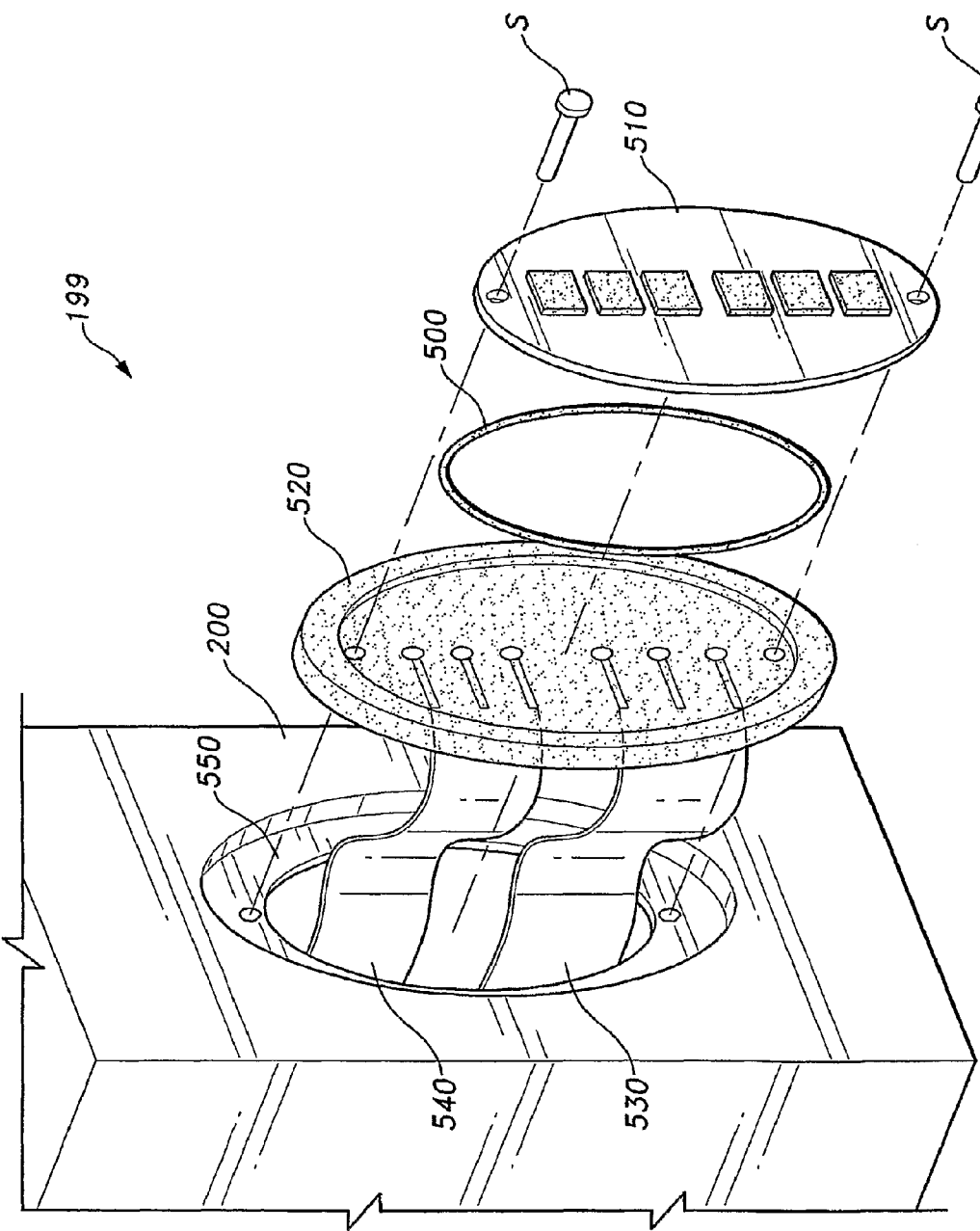
FIG. 5 is an exploded, perspective view of electronic device sealing components, according to the present invention.

For any type of electronic device, such as MP3 player, PDA, smart phone, web camera, camera, flashlight, camera strobe, computer system, handheld computer device, monitoring device, communication device, gauge, switch and other control device, robotic underwater locomotion device such as ROV, DSRV, AUV, etc, the device may be initially manufactured to have a water-tight, accessible, compartment. Alternatively, the device may be retrofitted with a water-tight, accessible compartment. As shown in FIG. 5, the electronic device case 200 of device 199 is preferably non-porous and water-tight. Moreover, case 200 may be designed to easily allow the escape of air from potential pocket forming areas to prevent any air remaining in the unit 199. This may be done by reducing pocket forming areas in the design of case 200 as well as providing holes or channels from necessary pockets to facilitate air evacuation. Physical or sonic vibration may also be used to encourage the evacuation of air from the interior of case 200.

A user interface having a mounting port 550 is disposed on the case and can be made water tight by providing a sealant or gasket 500 between interior components of the interface and exterior components of the interface. For example, as shown in FIG. 5, the user interface comprises internal component power leads 540, internal component communication leads (e.g., USB port leads) 530, a terminal pad 520 and replaceable/disposable switches/contacts 510 secured by screws S, or alternatively by a simple catch locking mechanism. A sealing gasket 500 is introduced between the terminal pad 520 and the contact pad 510. Moreover, the leads 530 may penetrate the case 200 and be sealed by grommet, sealant or other mechanism as long as the inside medium be maintained within the unit 199. The entire assembly is held in place and made functional by attachment of the contact pad 510 to the case via screws S. The device 199 could be immersed in fluid similar to the way that camera 100 is immersed as shown in FIGS. 1-4, except that instead of accessing a battery compartment, the assembler could access the interface mounting port 550 during fluid immersion and then reattach the interface components including water-tight seal 500 to seal the fluid inside the case 200. As in the camera 100 of the present invention, the preferred immersion fluids are perfluorocarbon (PFC) liquid, hydrofluoroether (HFE) liquid, perfluoropolyether (PFPE) liquid, or a solution comprising a mixture of alkylene glycol (such as propylene glycol), de-ionized water, and a corrosion inhibitor (such as benzotriazole). Alternatively, necessary interface electronics may be disposed and sealed entirely inside the case 200 and may be designed to communicate wirelessly with external devices. Additionally, battery packs and/or memory cards for either camera 100 or device 199 may be removable units protected on the inside with rubber seals, and having a connection to the camera 100 or device 199 through an interface having a terminal pad such as terminal pad 520 shown in FIG. 5.

It is to be understood that the present invention is not limited to the embodiments described above, but encompasses any and all embodiments within the scope of the following claims.

The invention claimed is:

1. A submersible electronic device, comprising:
   a leak-proof device body defining an internal chamber therein, wherein the internal chamber includes means for conveying power and data to and from the device;
   a resealable fluid access port disposed on the body of the device, the port being in fluid communication with the internal chamber;
   a user interface disposed on the device body;
   a sealing gasket being disposed between the fluid access port and the user interface;
   electronic components disposed within the device body; and
   wherein the device body is completely filled with a liquid selected from the group consisting of a perfluorocarbon liquid, a hydrofluorether liquid, a perfluoropolyether liquid, and a liquid mixture of alkylene glycol, de-ionized water, and a corrosion inhibitor, so that the liquid filled body and device are capable of withstanding extreme environmental pressures.

2. The submersible electronic device according to claim 1, wherein the liquid has a volume resistivity of at least approximately 1×108 ohm-cm.

3. The submersible electronic device according to claim 1, wherein the liquid has a dielectric strength of at least approximately 35 KV over a .10 inch electrode gap.

4. The submersible electronic device according to claim 1, wherein the liquid is substantially inert.

5. The submersible electronic device according to claim 1, wherein the liquid has a viscosity similar to water, is non-flammable, is thermally and chemically stable, and is compatible with sensitive materials found in electronic devices.

6. The submersible electronic device according to claim 1, wherein the user interface comprises:
   a terminal pad connected to the means for conveying power and data to and from the device, the terminal pad being disposed within the access port on the device body; and
   a replaceable contact pad being disposed atop the terminal pad and mounted to the device body by terminal pad mounting means.

7. The submersible electronic device according to claim 1, wherein the resealable fluid access port comprises a watertight sealable access door to a battery compartment inside the device.

8. The submersible electronic device according to claim 1, wherein the resealable fluid access port comprises the user interface.

9. The submersible electronic device according to claim 1, wherein the electronic device is a camera.

10. A submersible electronic device, comprising:
    a leak-proof device body defining an internal chamber therein, wherein the internal chamber includes means for conveying power and data to and from the device;
    a resealable fluid access port disposed on the body of the device, the port being in fluid communication with the internal chamber;
    a user interface disposed on the device body;
    a sealing gasket being disposed between the fluid access port and the user interface;
    electronic components disposed within the device body; and
    wherein the device body is completely filled with a liquid having the characteristics of being compatible with sensitive materials found in electronic devices, so that the liquid filled body and device are capable of withstanding extreme environmental pressures.

11. A method of making a submersible electronic device the submersible electronic device having a fluid access port disposed on the device body, comprising the steps of:
    providing a vacuum chamber work space; and then,
    opening the fluid access port on the device; and then,
    placing the device inside the vacuum chamber work space; and then,
    evacuating air from the vacuum chamber work space; and then,
    injecting a fluid selected from the group consisting of a perfluorocarbon liquid, a hydrofluorether liquid, a perfluoropolyether liquid, and a liquid mixture of alkylene glycol, de-ionized water, and a corrosion inhibitor into the vacuum chamber work space to provide total immersion of the device therein; and then,
    allowing the fluid to enter the device through the fluid access port; and then,
    sealing the fluid inside the body of the device; and then,
    removing the fluid filled device from the vacuum chamber.

12. The method of making a submersible electronic device according to claim 11, further comprising the step of agitating the device to remove air trapped therein.

* * * * *